(12) United States Patent
Wang et al.

(10) Patent No.: US 12,416,293 B2
(45) Date of Patent: Sep. 16, 2025

(54) COOLING SYSTEM AND WIND-DRIVEN GENERATOR SYSTEM

(71) Applicant: XINJIANG GOLDWIND SCIENCE & TECHNOLOGY CO., LTD., Xinjiang (CN)

(72) Inventors: Dinghui Wang, Beijing (CN); Tao Fang, Beijing (CN); Jinmeng Li, Beijing (CN)

(73) Assignee: XINJIANG GOLDWIND SCIENCE & TECHNOLOGY CO., LTD.

(*) Notice: Subject to any disclaimer, the term of this patent is extended or adjusted under 35 U.S.C. 154(b) by 0 days.

(21) Appl. No.: 17/998,174

(22) PCT Filed: Sep. 8, 2020

(86) PCT No.: PCT/CN2020/114020
§ 371 (c)(1),
(2) Date: Nov. 8, 2022

(87) PCT Pub. No.: WO2021/248717
PCT Pub. Date: Dec. 16, 2021

(65) Prior Publication Data
US 2023/0228251 A1    Jul. 20, 2023

(30) Foreign Application Priority Data
Jun. 9, 2020   (CN) .......................... 202010516556.1

(51) Int. Cl.
*F03D 80/60* (2016.01)
*H02K 9/19* (2006.01)

(52) U.S. Cl.
CPC ............... *F03D 80/60* (2016.05); *H02K 9/19* (2013.01); *F05B 2260/20* (2013.01)

(58) Field of Classification Search
None
See application file for complete search history.

(56) References Cited

U.S. PATENT DOCUMENTS 7,997,855 B2   8/2011   Bagepalli et al.
8,541,902 B2   9/2013   Casazza et al.
(Continued)

FOREIGN PATENT DOCUMENTS

CL   202203111   8/2022
CL   202203278   11/2022
(Continued)

OTHER PUBLICATIONS

Li et al.(CN 109441740 A)—machine translation (Year: 2019).*
(Continued)

*Primary Examiner* — Juan G Flores

(57) ABSTRACT

A cooling system and a wind-driven generator system. The cooling system comprising: a first cooling loop, a second cooling loop, a third cooling loop, a first heat exchanger and a second heat exchanger, wherein the first cooling loop comprises a first fluid pipeline and a first pump set; the second cooling loop comprises a second fluid pipeline and a second pump set, and the second fluid pipeline comprises a main path and a bypass; the third cooling loop comprises a third fluid pipeline and a third pump set, and the third fluid pipeline communicates with both the first heat exchanger and the second heat exchanger; the first heat exchanger is configured to thermally couple the first cooling medium, the second cooling medium and the third cooling medium to one another; the second heat exchanger is configured to thermally couple the second cooling medium to the third cooling medium.

17 Claims, 2 Drawing Sheets

(56) References Cited

U.S. PATENT DOCUMENTS

| | | | | |
|---|---|---|---|---|
| 8,800,313 | B2* | 8/2014 | Woo | F25B 7/00 62/336 |
| 8,978,386 | B2* | 3/2015 | Sekiai | F01K 21/047 60/726 |
| 2005/0122684 | A1 | 6/2005 | Chu et al. | |
| 2007/0235167 | A1 | 10/2007 | Brewer et al. | |
| 2011/0155356 | A1* | 6/2011 | Woo | F25B 7/00 62/335 |
| 2013/0174549 | A1* | 7/2013 | Sediai | F01K 21/047 60/641.1 |
| 2014/0290296 | A1 | 10/2014 | Katoh | |

FOREIGN PATENT DOCUMENTS

| | | |
|---|---|---|
| CL | 202203356 | 11/2022 |
| CN | 100523493 C | 8/2009 |
| CN | 101749096 A | 6/2010 |
| CN | 101968321 A | 2/2011 |
| CN | 201957389 U | 8/2011 |
| CN | 102412706 A | 4/2012 |
| CN | 202215442 U | 5/2012 |
| CN | 102158014 B | 10/2012 |
| CN | 203035467 U | 7/2013 |
| CN | 203098023 U | 7/2013 |
| CN | 101761453 B | 8/2014 |
| CN | 204179833 | 2/2015 |
| CN | 102192107 B | 7/2015 |
| CN | 103061993 B | 9/2015 |
| CN | 104956075 A | 9/2015 |
| CN | 106939877 A | 7/2017 |
| CN | 206707945 U | 12/2017 |
| CN | 107542629 A | 1/2018 |
| CN | 108141986 A | 6/2018 |
| CN | 109441740 A | 3/2019 |
| CN | 110278691 A | 9/2019 |
| CN | 209413982 U | 9/2019 |
| CN | 110671282 A | 1/2020 |
| CN | 111121506 A | 5/2020 |
| DE | 102018215531 A1 | 3/2020 |
| EP | 2 565 446 A2 | 3/2013 |
| EP | 2 803 855 A1 | 11/2014 |
| FR | 3070432 A1 | 3/2019 |
| JP | 2017057761 A | 3/2017 |
| KR | 20090127755 A | 12/2009 |
| WO | 01/08460 A1 | 2/2001 |
| WO | 2020/096786 A2 | 5/2020 |

OTHER PUBLICATIONS

The International Search Report mailed Mar. 17, 2021; PCT/CN2020/114020.

The Extended European Search Report dated Aug. 3, 2023; Appln. No. 20939549.0.

The First Indian Office Action dated Jul. 2, 2023; Appln. No. 202217062603.

Australian Examination Report No. 1; Appln. No. 2020452638; Dated Jan. 17, 2024.

The First Chinese Office Action dated Nov. 1, 2023; Appln. No. 202010516556.1.

Chilean Office Action dated Jan. 15, 2024; Appln. No. 202203357.

* cited by examiner

COOLING SYSTEM AND WIND-DRIVEN GENERATOR SYSTEM

CROSS-REFERENCE TO RELATED APPLICATIONS

This application is a National Stage of International Application No. PCT/CN2020/114020, filed on Sep. 8, 2020, which claims priority to Chinese Patent Application No. 202010516556.1, filed on Jun. 9, 2020, both of which are hereby incorporated by reference in their entireties.

TECHNICAL FIELD

The present application relates to the technical field of wind-driven power generation, and in particular to a cooling system and a wind-driven generator system.

BACKGROUND

In recent years, wind-driven generator systems have been gradually developed towards high power density, and the loss of the wind-driven generator system itself has increased accordingly, and the number of components that need heat dissipation simultaneously has also increased. Heat-generating components, such as a generator, a shafting, a pitch system, a nacelle cabinet, a nacelle, a converter cabinet and a transformer, need to undergo necessary heat dissipation and cooling treatment to achieve the normal operation of each heat-generating component, especially for an offshore wind-driven generator system, in which the heat-generating components are arranged in an E-TOP structure of the nacelle, resulting in more and more complex configuration and layout of the overall cooling system of the generator system in the nacelle. Therefore, it is necessary to design a more compact cooling system structure layout in the limited space of the nacelle, and the integrated cooling system design has become an important research direction.

SUMMARY

An object of the present application is to provide a cooling system and a wind-driven generator system. The cooling system can achieve balanced utilization of cold capacity and heat capacity and reduce system power consumption.

In one aspect, the present application proposes a cooling system. The cooling system comprises a first cooling loop, a second cooling loop, a third cooling loop, a first heat exchanger and a second heat exchanger, wherein the first cooling loop comprises a first fluid pipeline for cooling a first heat-generating component and a first pump set, and the first pump set is configured to cause a first cooling medium to circulate within the first fluid pipeline; the second cooling loop comprises a second fluid pipeline for cooling a second heat-generating component and a second pump set, the second fluid pipeline comprises a main path and a bypass, and the second pump set is configured to cause a second cooling medium to circulate within the main path or within the main path and the bypass; the third cooling loop comprises a third fluid pipeline for cooling a third heat-generating component and a third pump set, the third pump set is configured to cause a third cooling medium to circulate within the third fluid pipeline, and the third fluid pipeline communicates with both the first heat exchanger and the second heat exchanger; the first heat exchanger is configured to thermally couple the first cooling medium, the second cooling medium and the third cooling medium to one another in a manner in which the first cooling medium, the second cooling medium and the third cooling medium are isolated from one another; the second heat exchanger is configured to thermally couple the second cooling medium to the third cooling medium through the bypass in a manner in which the second cooling medium and the third cooling medium are isolated from each another.

In another aspect, the present application further provides a wind-driven generator system. The wind-driven generator system comprises: a first heat-generating component including at least one of a shafting, a cable, a nacelle, a pitch system, a nacelle cabinet, and a nacelle base; a second heat-generating component including a generator; a third heat-generating component including at least one of a transformer, a converter, and an auxiliary transformer; and any one of the cooling system as described above.

The cooling system provided by the present application includes the first cooling loop, the second cooling loop and the third cooling loop that operate independently from one another, as well as the first heat exchanger and the second heat exchanger. Through the liquid-liquid three-way first heat exchanger, the first cooling medium in the first cooling loop, the second cooling medium in the second cooling loop and the third cooling medium in the third cooling loop are thermally coupled in a manner in which these cooling media are isolated from one another. First, under suitable ambient temperature conditions, in a case where the temperature control requirement of the first heat-generating component of the small-capacity cooling system is satisfied, the surplus cooling load of the first cooling loop can be distributed to the generator cooling system of the second cooling loop and the electrical cooling system of the third cooling loop through the first heat exchanger, achieving a full utilization of the cooling capacity. Second, for the generator cooling system, the surplus cooling capacity from the small capacity cooling system is absorbed through the first heat exchanger to achieve over-generating of the generator system or achieve frequency conversion and energy saving of the rotating parts at the end of the generator system. Third, through the first heat exchanger, heat balance among the small-capacity cooling system, the generator cooling system and the electrical cooling system is achieved. At the same time, through the liquid-liquid two-way second heat exchanger, the second cooling medium in the bypass of the second cooling loop and the third cooling medium in the third cooling loop are thermally coupled in a manner in which these cooling media are isolated from each other, thereby a part of the residual heat carried by the second cooling loop is used for the heating of the third cooling loop, so as to achieve the appropriate application of the residual heat. While the heat dissipation requirement is satisfied, the balanced utilization of cold capacity and heat capacity is achieved through the thermal coupling between the cooling loops in which the cooling loops are isolated from one another, and the system power consumption is reduced.

BRIEF DESCRIPTION OF THE DRAWINGS

The present application can be better understood from the following description of specific implementations of the present application in conjunction with the accompanying drawings, wherein other features, objects and advantages of the present application can be more apparent by reading the following detailed description of non-limiting embodiments with reference to the accompanying drawings, and the same or similar reference numbers refer to the same or similar features.

REFERENCE SIGNS

Figure 1:
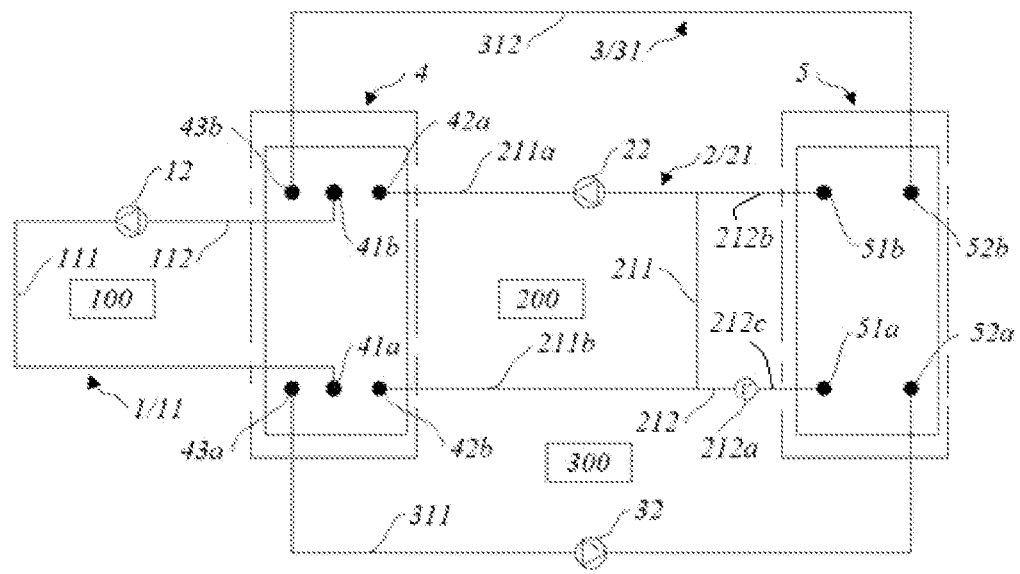
FIG. 1 is a simplified schematic structural diagram of a cooling system of a wind-driven generator system according to an embodiment of the present application.

First cooling loop 1; First fluid pipeline 11; First fluid branch 11a; First water supply pipe 111; First water return pipe 112; First branch heat sink 11b; First branch regulating valve VV1; First branch temperature sensor TT1; First branch flow sensor FF1; First heat dissipation unit 113; First valve V1; First liquid discharge valve LV1; First gas discharge valve AV1; First pressure monitoring device P1;

Second cooling loop 2; Second fluid pipeline 21; Main path 211; Second water supply pipe 211a; Second water return pipe 211b; Second fluid branch loop 2111; Second branch heat sink 2112; Bypass 212; Bypass regulating valve 212a; Second heat dissipation unit 213; Second total flow sensor F21; Second front total temperature sensor T21; Second middle total temperature sensor T22; Second rear total temperature sensor T23; Second valve V2; Second liquid discharge valve LV2; Second gas discharge valve AV2; Second pressure monitoring device P2;

Third cooling loop 3; Third fluid pipeline 31; First section 311; Second section 312; Third fluid branch 3121; Third branch heat sink 3122; Third heat dissipation unit 313; Heater H; Third total flow sensor F3; Third front total temperature sensor T31; Third middle total temperature sensor T32; Third rear total temperature sensor T33; Third branch regulating valve VV3; Third branch temperature sensor TT3; Third branch flow sensor FF3; Third valve V3; Third liquid discharge valve LV3; Third gas discharge valve AV3; Third pressure monitoring device P3;

First heat exchanger 4; First inlet end 41a; First outlet end 41b; Second inlet end 42a; Second outlet end 42b; Third inlet end 43a; Third outlet end 43b;

Second heat exchanger 5; Fourth inlet end 51a; Fourth outlet end 51b; Fifth inlet end 52a; Fifth outlet end 52b;

First pump set 12; Second pump set 22; Third pump set 32; Pump body Pu; Pump body regulating valve PV; Check valve SV; Pressure stabilizing device SP;

First heat-generating component 100; Second heat-generating component 200; Third heat-generating component 300.

DETAILED DESCRIPTION

Features of various aspects and exemplary embodiments of the present application are described in detail below. Numerous specific details are disclosed in the following detailed description to provide a thorough understanding of the present application. However, it will be apparent for those skilled in the art that the present application may be implemented without some of these specific details. The following description of the embodiments is merely to provide a better understanding of the present application by illustrating examples of the present application. The present application is in no way limited to any specific configurations and algorithms set forth below, but covers any modifications, substitutions and improvements of elements, components and algorithms without departing from the spirit of the present application. In the drawings and the following description, well-known structures and techniques have not been shown in order to avoid unnecessarily obscuring the present disclosure.

With the rapid development of wind-driven generator systems, a capacity of a single wind-driven generator system increases. The loss of the wind-driven generator system itself increases. In addition, the number of components that need heat dissipation also increases. Especially, with the development of the E-TOP layout structure of large-capacity offshore generator system, heat-generating components, such as a generator, a shafting, a pitch system, a nacelle cabinet, a converter cabinet and a transformer, are all arranged in the nacelle, and these heat-generating components need independent necessary heat dissipation and cooling treatments, which leads to an increasing number of cooling subsystems in the nacelle, and the configuration of the cooling subsystems becomes more and more complex. In view of the different control strategies, processes and layout positions of each cooling subsystem, a large deviation in the cooling distribution of each heat-generating component during the actual operation is likely to occur, and the system power consumption is large. It is urgently needed to optimize the overall layout and structure of the cooling subsystem of each heat-generating component of the wind-driven generator system, to appropriately utilize and distribute the heat capacity and cooling capacity of the system.

The purpose of the present application is to provide a multi way-coupled cooling system of a wind-driven generator system, which is especially suitable for using in a high-power offshore direct-drive permanent-magnet wind-driven generator system with the E-TOP layout. For a generator system that do not adopt the E-TOP layout (that is, not all main heat-generating components thereof are positioned in the nacelle), if the pipeline complexity is not considered, the multi way-coupled cooling system of the present application can also be used, that is, for the generator system, according to the actual positions of the heat-generating components, the same layout concept can be used in the layout of the respective cooling subsystems, and the overall layout of the cooling subsystems of the heat-generating components is optimized. For a better understanding of the present application, the cooling system and the wind-driven generator system according to the embodiments of the present application will be described in detail below with reference to FIG. 1 to FIG. 4.

With reference to FIG. 1, embodiments of the present application provide a wind-driven generator system including: a first heat-generating component 100, a second heat-generating component 200, a third heat-generating component 300, and a cooling system.

The first heat-generating component 100 is a combination of components that generate a small amount of heat, and a heat dissipation loss of the first heat-generating component 100 is small. Heat-dissipating subsystems of each heat-generating component can be incorporated into one cooling loop or several cooling branches in an integrated manner, so as to satisfy heat dissipation requirements of each heat-generating component. Optionally, the first heat-generating component 100 may include at least one of a shafting, a cable, a nacelle, a pitch system, a nacelle cabinet, and a nacelle base.

The second heat-generating component 200 is a combination of components that generate a large amount of heat, and the second heat-generating component 200 accordingly requires a large heat dissipation loss. Optionally, the second heat-generating component 200 may include a generator. Not only the second heat-generating component 200 (for example, a generator) generates a large amount of heat, but also the residual heat generated by the second heat-generating component 200 can be provided to other heat-generating components in a low temperature environment, so that minimum temperature operation requirements of the heat-generating components in low temperature environment are satisfied.

The third heat-generating component 300 is a combination of components that generate a large amount of heat. The third heat-generating component 300 generates more heat than the first heat-generating component 100, but generates less heat than the second heat-generating component 200. Optionally, the third heat-generating component 300 may include at least one of a transformer, a converter and an auxiliary transformer. In addition, the third heat-generating component 300 generally has a required minimum temperature to be maintained, and an increase or decrease of the heat dissipation loss of the third heat-generating component 300 is directly proportional to the heat dissipation loss of the second heat-generating component 200 (for example, a generator), that is, the third heat-generating component 300 and the second heat-generating component 200 operate oppositely.

It should be noted that, in actual operation and design, on the basis of the present application, according to the specific number of each type of heat-generating component, different cooling manners and cooling requirements, similar configurations and coupling configurations can be used for each cooling loop to form a whole cooling system. For ease of description, in embodiments of the present application, a first cooling loop 1 (i.e., a small-capacity cooling system) for cooling the first heat-generating component 100, a second cooling loop 2 (i.e., a generator cooling system) for cooling the second heat-generating component 200 and a third cooling loop 3 (i.e., the electrical cooling system) for cooling the third heat-generating component 300 are used as an example for illustration.

A cooling system provided in the embodiments of the present application includes: a first cooling loop 1, a second cooling loop 2, a third cooling loop 3, a first heat exchanger 4 and a second heat exchanger 5.

The first cooling loop 1 includes a first fluid pipeline 11 for cooling the first heat-generating component 100 and a first pump set 12 configured to cause a first cooling medium to circulate within the first fluid pipeline 11. The first cooling loop 1 communicates with the first heat exchanger 4.

The second cooling loop 2 includes a second fluid pipeline 21 for cooling the second heat-generating component 200 and a second pump set 22. The second fluid pipeline 21 includes a main path 211 and a bypass 212. The second pump set 22 is configured to cause a second cooling medium to circulate within the main path 211 or within the main path 211 and the bypass 212. The main path 211 communicates with the first heat exchanger 4, and the bypass 212 communicates with the second heat exchanger 5.

The third cooling loop 3 includes a third fluid pipeline 31 for cooling the third heat-generating component 300 and a third pump set 32 configured to cause a third cooling medium to circulate within the third fluid pipeline 31. The third fluid pipeline 31 communicates with both the first heat exchanger 4 and the second heat exchanger 5. The first heat-generating component 100 generates the least heat, the second heat-generating component 200 generates the most heat, and the third heat-generating component 300 generates the amount of heat between those of the first heat-generating component 100 and the second heat-generating component 200.

The first heat exchanger 4 is configured to thermally couple the first cooling medium, the second cooling medium and the third cooling medium in a manner in which the first cooling medium, the second cooling medium and the third cooling medium are isolated from one another. The first cooling medium, the second cooling medium and the third cooling medium may be a same liquid medium (for example, water or oil), or may be different liquid media. Optionally, the first heat exchanger 4 is a liquid-liquid three-way heat exchanger.

The second heat exchanger 5 is configured to thermally couple the second cooling medium and the third cooling medium through the bypass 212 in a manner in which the second cooling medium and the third cooling medium are isolated from each other. Optionally, the second heat exchanger 5 is a liquid-liquid two-way heat exchanger.

The cooling system provided by embodiments of the present application includes the first cooling loop 1, the second cooling loop 2 and the third cooling loop 3 that operate independently from one another, as well as the first heat exchanger 4 and the second heat exchanger 5. Through the liquid-liquid three-way first heat exchanger 4, the first cooling medium in the first cooling loop 1, the second cooling medium in the second cooling loop 2 and the third cooling medium in the third cooling loop 3 are thermally coupled in a manner in which these cooling media are isolated from one another. First, under suitable ambient temperature conditions, in a case where the temperature control requirement of the first heat-generating component 100 of the small-capacity cooling system is satisfied, the surplus cooling load of the first cooling loop 1 can be distributed to the generator cooling system of the second cooling loop 2 and the electrical cooling system of the third cooling loop 3 through the first heat exchanger 4, achieving a full utilization of the cooling capacity. Second, for the generator cooling system, the surplus cooling capacity from the small capacity cooling system is absorbed through the first heat exchanger 4 to achieve over-generating of the generator system or achieve frequency conversion and energy saving of the rotating parts at the end of the generator system. Third, through the first heat exchanger 4, heat balance among the small-capacity cooling system, the generator cooling system and the electrical cooling system is achieved. At the same time, through the liquid-liquid two-way second heat exchanger 5, the second cooling medium in the bypass 212 of the second cooling loop 2 and the third cooling medium in the third cooling loop 3 are thermally coupled in a manner in which these cooling media are isolated from each other, thereby a part of the residual heat carried by the second cooling loop 2 is used for the heating of the third cooling loop 3, so as to achieve the appropriate application of the residual heat. While the heat dissipation requirement is satisfied, the balanced utilization of cold capacity and heat capacity is achieved through the thermal coupling between the cooling loops in which the cooling loops are isolated from one another, and the system power consumption is reduced.

With further reference to FIG. 1, a bypass regulating valve 212a is arranged on the bypass 212. When the temperature of the third cooling medium is lower than a preset temperature, the bypass regulating valve 212a is opened, so that the second cooling medium within the bypass 212 exchanges heat with the third cooling medium through the second heat exchanger 5.

Therefore, under a condition of extremely low temperature, with the second heat exchanger 5, the generator cooling system transfer a part of the heat load generated by the loss to the electrical cooling system through the bypass 212, which not only appropriately utilizes the residual heat of the generator, but also satisfies minimum operation temperature requirements of heat-generating components of the electrical cooling system, such as a transformer, a converter and an auxiliary transformer.

Further, the first heat exchanger 4 includes a first heat conduction channel, a second heat conduction channel and a third heat conduction channel spaced apart from one another. The first heat conduction channel includes a first inlet end 41a and a first outlet end 41b. A first water supply pipe 111 of the first fluid pipeline 11 is connected to the first inlet end 41a. A first water return pipe 112 is connected to the first outlet end 41b.

The second heat conduction channel includes a second inlet end 42a and a second outlet end 42b. A second water supply pipe 211a of the second fluid pipeline 21 is connected to the second inlet end 42a. A second water return pipe 211b is connected to the second outlet end 42b.

The third heat conduction channel includes a third inlet end 43a and a third outlet end 43b. The third fluid pipeline 31 includes a first section 311 and a second section 312 extending between the first heat exchanger 4 and the second heat exchanger 5. The third pump set 32 is positioned in the first section 311. The third inlet end 43a is connected upstream of the first section 312, and the third outlet end 43b is connected downstream of the second section 312.

Therefore, a total of six interfaces are arranged on the first heat exchanger 4. The first cooling medium, the second cooling medium and the third cooling medium can transfer heat within the first heat exchanger 4 in a co-current or cross-flow manner, so as to realize the mutual transfer and balance of the heat of the three cooling loops. The six interfaces may be disposed on a same side of the first heat exchanger 4, or may be disposed on both sides of the first heat exchanger 4 respectively.

The second heat exchanger 5 includes a fourth heat conduction channel and a fifth heat conduction channel spaced apart from each other.

The fourth heat conduction channel includes a fourth inlet end 51a and a fourth outlet end 51b. A second bypass water supply pipe 212c of the bypass 212 of the second fluid pipeline 21 is connected to the fourth inlet end 51a. A second bypass water return pipe 212b of the bypass 212 is connected to the fourth outlet end 51b.

The fifth heat conduction channel includes a fifth inlet end 52a and a fifth outlet end 52b. The fifth inlet end 52a is connected downstream of the first section 311 of the third fluid pipeline 31, and the fifth outlet end 52b is connected upstream of the second section 312.

Therefore, a total of four interfaces are arranged on the second heat exchanger 5. The second cooling medium and the third cooling medium can transfer heat within the second heat exchanger 5 in a co-current or cross-flow manner, thereby realizing the mutual transfer and balance of the heat of the two cooling loops. The four interfaces may be disposed on a same side of the second heat exchanger 5, or may be disposed on both sides of the second heat exchanger 5 respectively.

A specific structure of each cooling loop will be described in further detail below with reference to FIG. 2 to FIG. 4.

Figure 2:
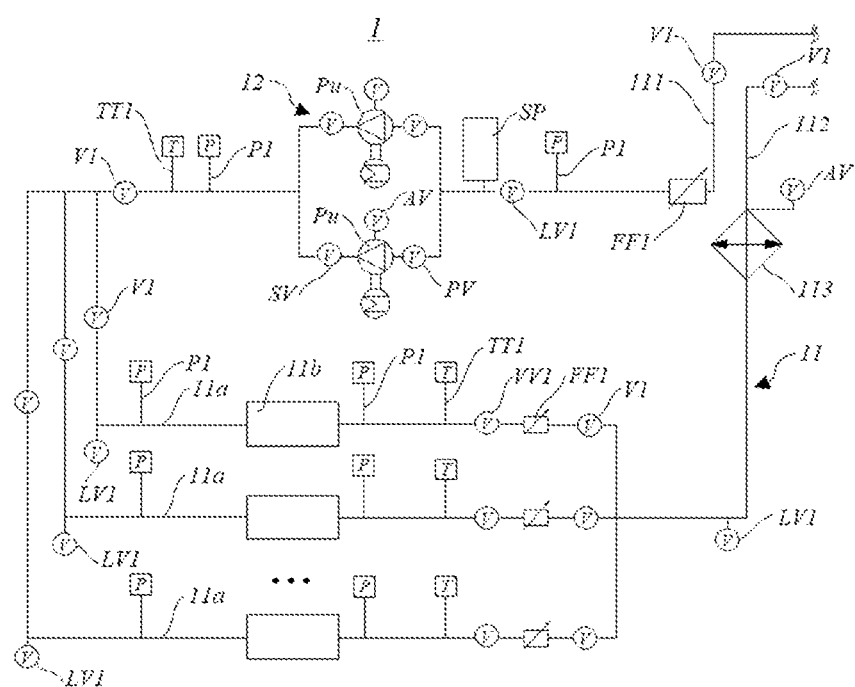
FIG. 2 is a schematic structural diagram of a first cooling loop of the cooling system shown in FIG. 1.

FIG. 2 shows a specific structure of the first cooling loop 1. The first cooling loop 1 is a small-capacity cooling system, including a first fluid pipeline 11, a first pump set 12, a plurality of first branch heat sinks 11b connected parallel and used for cooling the first heat-generating component 100, and a first heat dissipation unit 113 for taking away the heat loss of all components. The first cooling loop 1 further includes various functional valves, various sensors, pressure devices and filters, so as to realize normal, stable and maintainable operation of the first cooling loop 1.

The first cooling medium enters from the first heat conduction channel of the first heat exchanger 4, and is transported to the plurality of first branch heat exchangers 11b connected in parallel through the first pump set 12. After each branch heat exchanger exchanges heat with each first heat-generating component 100, the first cooling medium converges and flows into the first heat dissipation unit 113 and flows into the first heat conduction channel of the first heat exchanger 4.

Specifically, the first pump set 12 includes one pump body Pu or at least two pump bodies Pu connected in parallel. When the first pump set 12 includes at least two pump bodies Pu connected in parallel, a manner in which the at least two pump bodies Pu operate in parallel may be adopted, or a manner in which some of the pump bodies Pu operate and some of the pump bodies Pu are for backup may be adopted. With comprehensive consideration depending on of factors such as space layout size, system capacity, reliability and cost performance, energy-saving and fault-tolerant operation can be realized, that is, when one pump body Pu fails, the remaining pump body Pu can still meet all or more than 75% of the performance of the system. At the same time, in order to further achieve the optimal energy efficiency of the system, the first pump set 12 can adopt a control manner such as fixed frequency operation, high or low speed operation, variable frequency operation, or fault-tolerant operation with at least two pump bodies Pu, which meets the cooling load operation requirement of the first cooling loop 1 and improves the fault tolerance performance and effective energy-saving strategies of the system.

Each pump body is provided with a gas discharge valve AV to discharge gas during system operation, thereby protecting the safe operation of the first pump set 12. A check valve SV is arranged at the outlet of each pump body Pu to protect the pump body Pu. A pump body regulating valve PV is arranged at the inlet of each pump body Pu. The pump body regulating valve PV is closed quickly in response to the leakage problem of any one of the pump bodies Pu. A pump body Pu is cut off through a corresponding check valve SV and a corresponding pump body regulating valve PV. If the adopted pump body Pu is in a non-mechanical seal form, the setting of the pump body regulating valve PV can be omitted.

Optionally, a pressure stabilizing device SP is arranged at the inlet of the first pump set 12. The pressure stabilizing device SP is configured to generate an alarms when a system pressure fluctuation occurs in the system as the temperature changes and prevent the damage to the system. The pressure stabilizing device SP may be in the form of a high-level water tank or an expansion tank.

Further, a plurality of first fluid branches 11a in one-to-one correspondence with a plurality of first heat-generating components 100 are arranged on the first fluid pipeline 11. The plurality of first heat-generating components 100 may be, for example, shaftings, nacelles, pitch systems. A first branch heat sink 11b is arranged on each first fluid branch 11a. A first branch regulating valve VV1, a first branch temperature sensor TT1 and a first branch flow sensor FF1 are arranged downstream of each first fluid branch 11a. A first heat dissipation unit 113 is further arranged on the first water return pipe 112 of the first fluid pipeline 11.

The specific number of the first fluid branches 11a is set according to the number of the first heat-generating components 100. The temperature of the first cooling medium increases after passing through the plurality of first fluid branches 11a, and the first cooling medium enters the first heat dissipation unit 113 along the first water supply pipe 111.

A measured value of each first branch temperature sensor TT1 and a measured value of each first branch flow sensor FF1 are monitored. An opening degree of the first branch regulating valve VV1 is controlled according to a target temperature value of each of the first heat-generating components 100 to adjust a flow rate of each of the first fluid branches 11a.

By adjusting the opening degree according to the target temperature value of each first heat-generating component 100, the heat exchange requirement of each first heat-generating component 100 can be satisfied. The arrangement of the first branch regulating valve VV1 can avoid the problems that the loss values of each first fluid branch 11a are different, the calculation process is prone to lead to deviation, and the flow is prone to unevenness.

Optionally, a first valve V1 is arranged at at least one of the inlet and the outlet of the first pump set 12, the first water supply pipe 111 and the first water return pipe 112 of the first fluid pipeline 11, the outlet of the first pump set 12 and upstream and the downstream of each first fluid branch 11a. By closing the first valve V1, components on a corresponding first fluid branch 11a can be replaced and maintained.

Optionally, a first liquid discharge valve LV1 is further arranged on at least one of the first fluid pipeline 11 and each first fluid branch 11a, for local liquid discharge during maintenance and replacement of components.

Optionally, a first filter is arranged at the inlet of the first pump set 12 to ensure the cleanliness of the system. In addition, the first filter has a liquid discharge function and can be used as a local liquid discharge point of the first pump set 12.

Optionally, each of the first pump set 12 and the first heat dissipation unit 113 is provided with a first gas discharge valve AV1. The first heat dissipation unit 113 is configured to take away the heat loss of all components and achieve local or high point gas discharge through the first gas discharge valve AV1. The first cooling medium, after passing through the first heat dissipation unit 113, is brought into the first heat exchanger 4 under the action of the first pump set 12.

Optionally, a first pressure monitoring device P1 is arranged at at least one of the inlet and the outlet of the first pump set 12, and upstream and downstream of each first fluid branch 11a. Optionally, the first pressure monitoring device P1 includes a first pressure transducer and a first pressure display device. The first pressure transducer is configured for local and remote monitoring of system operation conditions. The first pressure display device is configured for local liquid injection and operation and maintenance observation.

Figure 3:
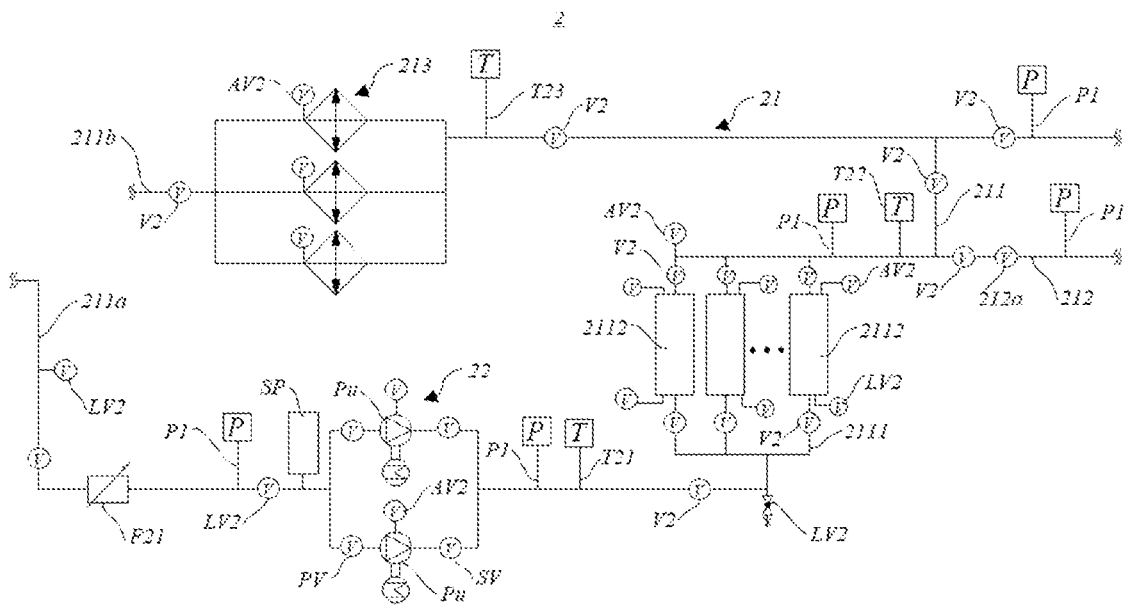
FIG. 3 is a schematic structural diagram of a second cooling loop of the cooling system shown in FIG. 1.

FIG. 3 shows a specific structure of the second cooling loop 2. The second cooling loop 2 is a generator cooling system, including a second fluid pipeline 21, a second pump set 22, a plurality of second branch heat sinks 2112 connected in parallel and used for cooling the second heat-generating component 200, and a second heat dissipation unit 213 for taking away the heat loss of all components. The second cooling loop 2 further includes various functional valves, various sensors, pressure stabilizing devices and filters to realize the normal, stable and maintainable operation of the second cooling loop 2.

The second cooling medium enters from the second heat conduction channel of the first heat exchanger 4, and is transported to the plurality of second branch heat exchangers 2112 connected in parallel through the second pump set 22. After each branch heat exchanger exchanges heat with the second heat-generating component 200, when the bypass regulating valve 212a on the bypass 212 is opened, the second cooling medium converges and flows into the second heat dissipation unit 213 from the main path 211 and the bypass 212 respectively, and flows into the second heat conduction channel of the first heat exchanger 4.

The second cooling medium entering the bypass 212 flows through the fourth heat conduction channel of the second heat exchanger 5, exchanges heat with the third cooling medium, and then joins with the second cooling medium in the main path 211. When the bypass regulating valve 212a on the bypass 212 is closed, the second cooling medium directly enters the second heat dissipation unit 213 from the main path 211 and flows into the second heat conduction channel of the first heat exchanger 4.

Specifically, the second pump set 12 includes one pump body Pu or at least two pump bodies Pu connected in parallel. When the second pump set 22 includes at least two pump bodies Pu connected in parallel, a manner in which the at least two pump bodies Pu operate in parallel may be adopted, or a manner in which some of the pump bodies Pu operate and some of the pump bodies Pu are for backup may be adopted. With comprehensive consideration depending on of factors such as space layout size, system capacity, reliability and cost performance, energy-saving and fault-tolerant operation can be realized, that is, when one pump body Pu fails, the remaining pump body Pu can still meet all or more than 75% of the performance of the system. At the same time, in order to further achieve the optimal energy efficiency of the system, the second pump set 22 can adopt a control manner such as fixed frequency operation, high or low speed operation, variable frequency operation, or fault-tolerant operation with at least two pump bodies Pu, which meets the cooling load operation requirement of the second cooling loop 2 and improves the fault tolerance performance and effective energy-saving strategies of the system.

The pump body is provided with a gas discharge valve AV to exhaust gas during system operation, thereby protecting the safe operation of the first pump set 12. A check valve SV is arranged at the outlet of the pump body Pu to protect the pump body Pu. A pump body regulating valve PV is arranged at the inlet of the pump body Pu. The pump body regulating valve PV is closed quickly in response to the leakage problem of any one of the pump bodies Pu. A pump body Pu is cut off through a corresponding check valve SV and a corresponding pump body regulating valve PV. If the adopted pump body Pu is in a non-mechanical seal form, the setting of the pump body regulating valve PV can be omitted.

Optionally, a pressure stabilizing device SP is arranged at the inlet of the second pump set 22 for stabilizing the system pressure.

Optionally, a second filter is arranged at the inlet of the second pump set 22 to ensure the cleanliness of the system. In addition, the second filter has a liquid discharge function and can be used as a local liquid discharge point of the second pump set 22.

Further, a plurality of second fluid branches 2111 corresponding to the second heat-generating component 200 are arranged on the main path 211 of the second fluid pipeline 21. The second heat-generating component 200 may be, for example, a generator. The bypass 212 is arranged downstream of the plurality of second fluid branches 2111. A second branch heat sink 2112 is arranged on each second fluid branch 2111. A second heat dissipation unit 213 is further arranged on the second water return pipe 211*b* of the main path 211. Since the flow and heat exchange of the plurality of second fluid branches 2111 are evenly arranged, there is no need to provide relevant flow adjustment measures.

After passing through the second heat dissipation unit 213, the second cooling medium enters the first heat exchanger 4, absorbs the surplus cooling capacity in the first cooling loop 1 and realizes a balanced distribution of cooling capacity with the third cooling loop 3, so as to avoid deviation in the heat dissipation calculation. After enough heat is reached, each second branch heat sink 2112 and the second pump set 22 can be controlled by means of frequency conversion or high or low speed, so as to achieve the purpose of energy saving, or in the case where the cooling capacity is surplus and the wind condition satisfies a desired condition, over-generating of the generator system is achieved.

In addition, the main path 211 is further provided with a second total flow sensor F21 positioned at the inlet of the second pump set 22, a second front total temperature sensor T21 positioned at the outlet of the second pump set 22, a second middle total temperature sensor T22 positioned downstream of the plurality of second fluid branches 2111, and a second rear total temperature sensor T23 positioned at the inlet of the second heat dissipation unit 213.

According to a temperature difference between the second middle total temperature sensor T22 and the second front total temperature sensor T21 and a flow rate of the second total flow sensor F21, a total dissipated heat loss of the second fluid pipeline 21 is obtained. In addition, a real-time loss change of the second cooling loop 2 according to the change of the ambient temperature may further be calculated, facilitating optimizing system accumulation data.

According to a temperature difference between the second rear total temperature sensor T23 and the second middle total temperature sensor T22 and a flow rate of the second middle total flow sensor F22, a to-be-dissipated heat loss of the second fluid pipeline 21 before entering the second heat dissipation unit 213 is obtained. According to the difference between the total dissipated heat loss and the to-be-dissipated heat loss, a waste heat transferred from the bypass 212 to the third cooling loop 3 is obtained.

Optionally, a second pressure monitoring device P2 is arranged at at least one of the inlet and the outlet of the second pump set 22, downstream of the plurality of second fluid branches 2111, and upstream and downstream of the bypass 212. Optionally, the second pressure detecting device P2 includes a second pressure transmitter and a second pressure display device. The second pressure transducer is configured for local and remote monitoring of system operating conditions. The second pressure display device is configured for local fluid injection and operation and maintenance observation.

A second pressure monitoring device P2 is provided on the bypass 212 entering the second heat exchanger 5 to remotely and locally determine the blockage of the second heat exchanger 5 and the second cooling loop 2 for replacement and maintenance in advance. A second valve V2 is provided on upstream and downstream of the bypass 212, which can cut the second heat exchanger 5 out of the system to meet maintenance requirements.

Optionally, a second valve V2 is arranged at at least one of the second water supply pipe 211*a*, the second water return pipe 211*b*, the outlet of the second pump set 22, upstream and downstream of each second fluid branch 2111, upstream and downstream of the bypass 212 and the inlet of the second heat dissipation unit 213.

The second cooling medium with high-temperature enters the second heat dissipation unit 213. The second heat dissipation unit 213 is provided with a second gas discharge valve AV2 for high point and local gas discharge of the second heat dissipation unit 213. A second valve V2 is arranged at the inlet of the second heat dissipation unit 213 and on the second water return pipe 211*b*. The second heat dissipation unit 213 can be switched out to facilitate replacement and maintenance of the second heat dissipation unit 213.

The second valve V2 is arranged on each of the second water supply pipe 211*a* and the second return water pipe 211*b* of the second cooling loop 2, which can easily switch out components on the main path 211 and the bypass 212 and the second branch heat sinks 2112 on the plurality of second fluid branches 2111, and can also switch out the first heat exchanger 4 from the second cooling loop 2. The second valve V2 is arranged on each second fluid branch 2111, which can switch out the second branch heat sink 2112 from the second cooling loop 2.

Optionally, a second liquid discharge valve LV2 is arranged on at least one of the second fluid pipeline 21, each second fluid branch 2111 and each second branch heat sink 2112. The second cooling medium in the first heat exchanger 4, the second cooling loop 2 side and the second cooling unit 213 can be locally discharged through the second liquid discharge valve LV2.

Optionally, a second gas discharge valve AV2 is arranged at at least one of the second pump set 22, the second fluid pipeline 21, the second heat dissipation unit 213 and each second branch heat sink 2112. The second branch heat sink 2112 is provided with the second gas discharge valve AV2 and the second liquid discharge valve LV2, which facilitates the gas discharge during the liquid injection process of the second branch heat sink 2112 and the gas discharge during maintenance and replacement of the second branch heat sink 2112.

Figure 4:
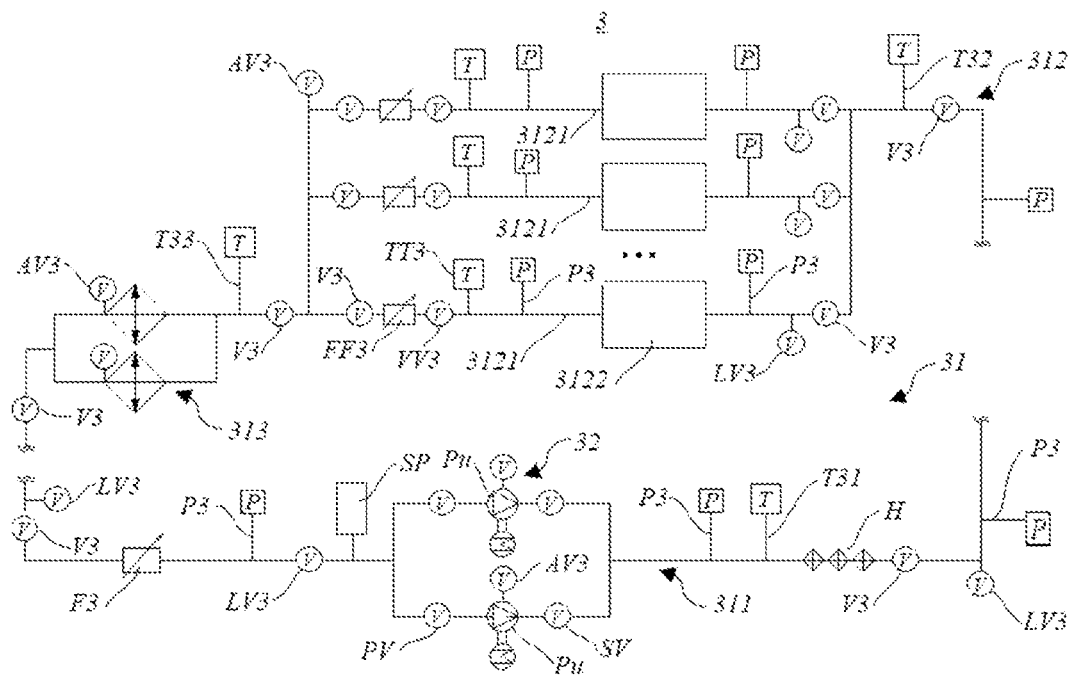
FIG. 4 is a schematic structural diagram of a third cooling loop of the cooling system shown in FIG. 1.

FIG. 4 shows a specific structure of the third cooling loop 3. The third cooling loop 3 is an electrical cooling system, including a third fluid pipeline 31, a third pump set 32, a plurality of third branch heat sinks 3122 connected in parallel and used for cooling the third heat-generating component 300, and the third heat dissipation unit 313 taking away heat loss of all the components. The third cooling loop 3 further includes a heater, various functional valves, various sensors, pressure stabilizing devices and filters, so as to realize the normal, stable and maintainable operation of the third cooling loop 3.

The third cooling medium enters from the third heat conduction channel of the first heat exchanger 4. After the third pump set 32 makes the third cooling medium flow through the fifth heat conduction channel of the second heat exchanger 5, the third cooling medium is transported to the plurality of first heat exchangers connected in parallel. After each branch heat exchanger exchanges heat with the third heat-generating component 300, the third cooling medium converges and flows into the third heat dissipation unit 313 and flows into the third heat conduction channel of the first heat exchanger 4.

Specifically, the third pump set 32 includes one pump body Pu or at least two pump bodies Pu connected in parallel. When the third pump set 32 includes at least two pump bodies Pu connected in parallel, a manner in which the at least two pump bodies Pu operate in parallel may be adopted, or a manner in which some of the pump bodies Pu operate and some of the pump bodies Pu are for backup may be adopted. With comprehensive consideration depending on of factors such as space layout size, system capacity, reliability and cost performance, energy-saving and fault-tolerant operation can be realized, that is, when one pump body Pu fails, the remaining pump body Pu can still meet all or more than 75% of the performance of the system. At the same time, in order to further achieve the optimal energy efficiency of the system, the third pump set 32 can adopt a control manner such as fixed frequency operation, high or low speed operation, variable frequency operation, or fault-tolerant operation with at least two pump bodies Pu, which meets the cooling load operation requirement of the third cooling loop 3 and improves the fault tolerance performance and effective energy-saving strategies of the system.

The pump body is provided with a gas discharge valve AV to exhaust gas during system operation, thereby protecting the safe operation of the third pump set 32. A check valve SV is arranged at the outlet of the pump body Pu to protect the pump body Pu. A pump body regulating valve PV is arranged at the inlet of the pump body Pu. The pump body regulating valve PV is closed quickly in response to the leakage problem of any one of the pump bodies Pu. A pump body Pu is cut off through a corresponding check valve SV and a corresponding pump body regulating valve PV. If the adopted pump body Pu is in a non-mechanical seal form, the setting of the pump body regulating valve PV can be omitted.

Optionally, a pressure stabilizing device SP is arranged at the inlet of the third pump set 32 for stabilizing the system pressure.

Further, a third total flow sensor F3 is arranged upstream of the first section 311 of the third fluid pipeline 31. A third front total temperature sensor T31 is arranged downstream of the first section 311. A third heat dissipation unit 313 is arranged downstream of the second section 312.

According to the number and the heat dissipation loss of the third heat-generating components 300, a plurality of third fluid branches 3121 in one-to-one correspondence with a plurality of third heat-generating components 300 are arranged on the second section 312. The plurality of third heat-generating components 300 may be, for example, transformers, a converters, or an auxiliary transformer. Each third fluid branch 3121 is provided with a third branch heat sink 3122. A third branch regulating valve VV3, a third branch temperature sensor TT3 and a third branch flow sensor FF3 are arranged downstream of each third fluid branch 3121.

A measured value of the third branch temperature sensor TT3 and a measured value of the third branch flow sensor FF3 are monitored, and an opening degree of the third branch regulating valve VV3 is controlled according to a target temperature value of each of the third heat-generating components 300 to adjust a flow rate of each of the third fluid branches 3121.

Further, a heater H is arranged downstream of the first section 311 of the third fluid pipeline 31. The heater H is activated when the temperature of the third cooling medium is lower than a preset temperature and the second heat-generating component 200 is not activated.

Since the third heat-generating component 300 (that is, the converter) cannot be activated at extremely low temperature, it needs to be preheated by the cooling medium in the third cooling loop 3. If the second heat-generating component 200 (that is, the generator) is not activated, the converter can heat the cooling medium by activating the heater H, so as to meet the preheating requirement before the converter is activated. If the generator is activated during this period, the heater H is turned off and the bypass regulating valve 212a is opened. The residual heat generated by the generator can heat the cooling medium in the second cooling loop 2, and the cooling medium enters the second heat exchanger 5 through the bypass 212.

The third cooling medium with low-temperature exchanges heat with the second cooling medium with high-temperature in the second heat exchanger 5, until the preset temperature at which the converter can be activated is reached. When the temperature of the third cooling medium reaches the preset temperature, the converter starts to operate, and the bypass regulating valve 212a is closed. By reusing the residual heat of the generator and activating the heater H as infrequently as possible, the self-consumption power of the system can be saved and the energy consumption of the system can be reduced.

Optionally, a third total temperature sensor T32 is arranged upstream of the second section 312. An ON/OFF state of the heater H and the opening degree of the bypass regulating valve 212a are controlled according to a measured value of the third total temperature sensor T32, so as to meet the system requirements. By controlling the opening degree of the bypass regulating valve 212a, the flow rate of the high-temperature cooling medium entering the bypass 212 is adjusted, thereby gradually heating the third cooling medium.

The heated third cooling medium enters the third heat dissipation unit 313, and then enters the first heat exchanger 4 again after heat dissipation, absorbs the surplus cooling capacity in the first cooling loop 1, and at the same time realizes balanced distribution of heat with the second cooling loop 2 and achieves the effect of energy saving of the third pump set 32 or over-generating.

Further, a third rear total temperature sensor T33 is further arranged downstream of the second section 312. According to a temperature difference between the third rear total temperature sensor T33 and the third front total temperature sensor T31 and a flow rate of the third total flow sensor F3, an exchanged heat of the third cooling medium after flowing through the first heat exchanger 4 is obtained. According to a temperature difference between the third rear total temperature sensor T33 and the third middle total temperature sensor T32 and a flow rate of the third total flow sensor F3, a total generated heat of the third heat-generating component 300 is obtained.

Optionally, a third valve V3 is arranged at at least one of upstream and downstream of the first section 311, upstream and downstream of the second section 312, upstream and downstream of each of the third fluid branches 3121 and an inlet of the third heat dissipation unit 313.

Optionally, a third liquid discharge valve LV3 is arranged on at least one of the first section 311 and each of the third fluid branches 3121. Optionally, a third filter is arranged at the inlet of the third pump set 32 to ensure the cleanliness of the system. In addition, the first filter has a liquid discharge function and can be used as a local liquid discharge point of the first pump set 12.

Optionally, a third gas discharge valve AV3 is arranged on at least one of the third pump set 32, the third heat dissipation unit 313, and each of the third fluid branches 3121. The functions of the third valve V3, the third liquid discharge valve LV3 and the third gas discharge valve AV3 are similar to those of the aforementioned second valve V2, the second liquid discharge valve LV2 and the second gas discharge valve AV2, respectively, and will not be repeated.

Optionally, a third pressure monitoring device P3 is arranged at at least one of an inlet and an outlet of the third pump set 33, downstream of the first section 311, upstream of the second section 312, and upstream and downstream of each of the third fluid branches 3121. Optionally, the third pressure detection device P3 includes a third pressure transducer and a third pressure display device, The third pressure transducer is configured for local and remote monitoring of the system operating condition. The third pressure display device is configured for local fluid injection and operation and maintenance observation.

Therefore, in the cooling system provided by the embodiment of the present application, the first cooling loop 1, the second cooling loop 2 and the third cooling loop 3 form respective closed-loop circulations through pipelines, valves, temperature sensors, flow sensors, pressure transducers and the like. Under the condition that each cooling loop operates independently, the first heat exchanger 4 and the second heat exchanger 5 conduct heat transfer but not mass transfer in each cooling loop, so as to realize the appropriate distribution of multiple system cooling capacity, and satisfy the heat dissipation requirements of each heat-generating component. At the same time, a regulating valve is arranged in the cooling loop to adjust the flow rate of each cooling loop according to the load requirement of each heat-generating component. Under appropriate ambient temperature conditions, when the temperature control requirements of the first heat-generating component 100 of the first cooling loop 1 are satisfied, the surplus cooling capacity is distributed to the second cooling circuit 2 and the third cooling circuit 3. A part of the residual heat carried by the second cooling loop 2 is used for heating the third cooling loop 3 through the bypass 212, reducing the power consumption caused by the electric heating of the third cooling loop 3. While the heat dissipation requirements are satisfied, through thermal coupling between cooling loops in a manner in which these cooling loops are isolated from one another, appropriate distribution of cooling capacity and appropriate application of waste heat can be realized, thereby realizing balanced utilization of cold capacity and heat capacity and reducing system power consumption.

In addition, the wind-driven generator system provided by the embodiments of the present application adopts the aforementioned cooling system, which can effectively record the system loss and the heat transfer direction during the operation of the generator system. At the same time, combined with the ambient temperature, more appropriate component selection can be found out, providing sufficient data record basis for the subsequent evaluation of the reliability of wind-driven generator system.

In addition, the cooling system according to the above-described exemplary embodiments can be applied to various electrical apparatuses requiring heat dissipation, such as but not limited to wind-driven generator systems.

Those skilled in the art should understand that the above-mentioned embodiments are all illustrative and not restrictive. Different technical features appearing in different embodiments can be combined to achieve beneficial effects. Those skilled in the art should be able to understand and implement other modified embodiments of the disclosed embodiments on the basis of studying the drawings, the description, and the claims. In the claims, the term "comprising" does not exclude other means or steps; an article is intended to include one or more articles when it is not modified by a quantifier, and may be used interchangeably with "one or more articles"; the terms "first", "second" are used to denote a name and not to denote any particular order. Any reference signs in the claims should not be construed as limiting the protection scope. The functions of several parts appearing in the claims can be realized by a single hardware or software module. The presence of certain technical features in different dependent claims does not mean that these technical features cannot be combined to obtain beneficial effects.

The invention claimed is:

1. A cooling system, comprising a first cooling loop, a second cooling loop, a third cooling loop, a first heat exchanger and a second heat exchanger, wherein the first cooling loop comprises a first fluid pipeline for cooling a first heat-generating component and a first pump set, and the first pump set is configured to cause a first cooling medium to circulate within the first fluid pipeline;

the second cooling loop comprises a second fluid pipeline for cooling a second heat-generating component and a second pump set, the second fluid pipeline comprises a main path and a bypass, and the second pump set is configured to cause a second cooling medium to circulate within the main path or within the main path and the bypass;

the third cooling loop comprises a third fluid pipeline for cooling a third heat-generating component and a third pump set, the third pump set is configured to cause a third cooling medium to circulate within the third fluid pipeline, and the third fluid pipeline communicates with both the first heat exchanger and the second heat exchanger;

the first heat exchanger is configured to thermally couple the first cooling medium, the second cooling medium and the third cooling medium to one another in a manner in which the first cooling medium, the second cooling medium and the third cooling medium are isolated from one another;

the second heat exchanger is configured to thermally couple the second cooling medium to the third cooling medium through the bypass in a manner in which the second cooling medium and the third cooling medium are isolated from each another, wherein a bypass regulating valve is arranged on the bypass, and when a temperature of the third cooling medium is lower than a preset temperature, the bypass regulating valve is opened, so that the second cooling medium within the bypass exchanges heat with the third cooling medium through the second heat exchanger;

the first heat exchanger comprises a first heat conduction channel, a second heat conduction channel and a third heat conduction channel spaced apart from one another;

the first heat conduction channel comprises a first inlet end and a first outlet end, a first water supply pipe of the first fluid pipeline is connected to the first inlet end, and a first water return pipe of the first fluid pipeline is connected to the first outlet end;

the second heat conduction channel comprises a second inlet end and a second outlet end, a second water supply pipe of the second fluid pipeline is connected to the second inlet end, and a second water return pipe of the second fluid pipeline is connected to the second outlet end;

the third heat conduction channel comprises a third inlet end and a third outlet end, the third fluid pipeline comprises a first section and a second section extending between the first heat exchanger and the second heat exchanger, the third pump set is positioned on the first section, the third inlet end is connected upstream of the first section, and the third outlet end is connected downstream of the second section;

the first heat-generating component comprises a plurality of first heat-generating components, a plurality of first fluid branches in one-to-one correspondence with the plurality of first heat-generating components are arranged on the first fluid pipeline, a first branch heat sink is arranged on each of the first fluid branches, a first branch regulating valve, a first branch temperature sensor and a first branch flow sensor are arranged downstream of each of the first fluid branches, and a first heat dissipation unit is further arranged on the first water return pipe of the first fluid pipeline;

a measured value of the first branch temperature sensor and a measured value of the first branch flow sensor are monitored, and an opening degree of the first branch regulating valve is controlled according to a target temperature value of each of the first heat-generating components to adjust a flow rate of each of the first fluid branches;

a first valve is arranged on at least one of the first water supply pipe and the first water return pipe of the first fluid pipeline, an outlet of the first pump set, and upstream and downstream of each of the first fluid branches;

a first liquid discharge valve is further arranged on at least one of the first fluid pipeline and each of the first fluid branches; and a first gas discharge valve is arranged at at least one of the first pump set and at the first heat dissipation unit.

2. The cooling system according to the claim 1, wherein the second heat exchanger comprises a fourth heat conduction channel and a fifth heat conduction channel spaced apart from each other;

the fourth heat conduction channel comprises a fourth inlet end and a fourth outlet end, a second bypass water supply pipe of the bypass of the second fluid pipeline is connected to the fourth inlet end, and a second bypass water return pipe of the bypass is connected to the fourth outlet end;

the fifth heat conduction channel comprises a fifth inlet end and a fifth outlet end, the fifth inlet end is connected downstream of the first section of the third fluid pipeline, and the fifth outlet end is connected upstream of the second section.

3. The cooling system according to the claim 2, wherein a plurality of second fluid branches corresponding to the second heat-generating component is arranged on the main path of the second fluid pipeline, the bypass is arranged downstream of the plurality of second fluid branches, a second branch heat sink is arranged on each of the second fluid branches, and a second heat dissipation unit is arranged on the second water return pipe of the main path;

the main path is further provided with a second total flow sensor positioned at an inlet of the second pump set, a second front total temperature sensor positioned at an outlet of the second pump set, a second middle total temperature sensor positioned downstream of the plurality of second fluid branches, and a second rear total temperature sensor positioned at an inlet of the second heat dissipation unit.

4. The cooling system according to the claim 3, wherein a total dissipated heat loss of the second fluid pipeline is obtained according to a temperature difference between the second middle total temperature sensor and the second front total temperature sensor;

a to-be-dissipated heat loss of the second fluid pipeline before entering the second heat dissipation unit is obtained according to a temperature difference between the second rear total temperature sensor and the second middle total temperature sensor;

a residual heat transferred from the bypass to the third cooling loop is obtained according to a difference between the total dissipated heat loss and the to-be-dissipated heat loss.

5. The cooling system according to the claim 3, wherein a second valve is arranged on at least one of the second water supply pipe, the second water return pipe, the outlet of the second pump set, upstream and downstream of each of the second fluid branches, upstream and downstream of the bypass and the inlet of the second heat dissipation unit;

a second liquid discharge valve is arranged on at least one of the second fluid pipeline, each of the second fluid branches and each of the second branch heat sinks;

a second gas discharge valve is arranged at at least one of the second pump set, the second fluid pipeline, the second heat dissipation unit and each of the second branch heat sinks.

6. The cooling system according to the claim 3, wherein a second pressure monitoring device is arranged at at least one of the inlet and the outlet of the second pump set, downstream of the plurality of second fluid branches and upstream and downstream of the bypass.

7. The cooling system according to the claim 2, wherein a third total flow sensor is arranged upstream of the first section of the third fluid pipeline, a third front total temperature sensor is arranged downstream of the first section, and a third heat dissipation unit is arranged downstream of the second section;

the third heat-generating component comprises a plurality of third heat-generating components, a plurality of third fluid branches in one-to-one correspondence with the plurality of third heat-generating components are arranged on the second section, a third branch heat sink is arranged on each of the third fluid branches, and a third branch regulating valve, a third branch temperature sensor and a third branch flow sensor are arranged downstream of each of the third fluid branches;

a measured value of the third branch temperature sensor and a measured value of the third branch flow sensor are monitored, and an opening degree of the third branch regulating valve is controlled according to a target temperature value of each of the third heat-generating components to adjust a flow rate of each of the third fluid branches.

8. The cooling system according to the claim 7, wherein a heater is arranged downstream of the first section of the third fluid pipeline, and the heater is activated when a temperature of the third cooling medium is lower than a preset temperature and the second heat-generating component is not activated.

9. The cooling system according to the claim 8, wherein a third middle total temperature sensor is further arranged upstream of the second section, and an ON/OFF state of the heater and an opening degree of the bypass regulating valve are controlled according to a measured value of the third middle total temperature sensor.

10. The cooling system according to the claim 7, wherein a third rear total temperature sensor is further arranged downstream of the second section and a third middle total temperature sensor is arranged upstream of the second section, and a total generated heat of the third heat-generating component is obtained according to a temperature difference between the third rear total temperature sensor and the third middle total temperature sensor and the flow rate of the third total flow sensor;

an exchanged heat of the third cooling medium after flowing through the first heat exchanger is obtained according to the temperature difference between the third rear total temperature sensor and the third front total temperature sensor and the flow rate of the third total flow sensor.

11. The cooling system according to the claim 7, wherein a third valve is arranged at at least one of upstream and downstream of the first section, upstream and downstream of the second section, upstream and downstream of each of the third fluid branches and an inlet of the third heat dissipation unit;

a third liquid discharge valve is arranged on at least one of the first section and each of the third fluid branches;

a third gas discharge valve is arranged on at least one of the third pump set, the third heat dissipation unit, and each of the third fluid branches.

12. The cooling system according to the claim 7, wherein a third pressure monitoring device is arranged at at least one of an inlet and an outlet of the third pump set, downstream of the first section, upstream of the second section, and upstream and downstream of each of the third fluid branches.

13. A cooling system, comprising a first cooling loop, a second cooling loop, a third cooling loop, a first heat exchanger and a second heat exchanger, wherein the first cooling loop comprises a first fluid pipeline for cooling a first heat-generating component and a first pump set, and the first pump set is configured to cause a first cooling medium to circulate within the first fluid pipeline;

the second cooling loop comprises a second fluid pipeline for cooling a second heat-generating component and a second pump set, the second fluid pipeline comprises a main path and a bypass, and the second pump set is configured to cause a second cooling medium to circulate within the main path or within the main path and the bypass;

the third cooling loop comprises a third fluid pipeline for cooling a third heat-generating component and a third pump set, the third pump set is configured to cause a third cooling medium to circulate within the third fluid pipeline, and the third fluid pipeline communicates with both the first heat exchanger and the second heat exchanger;

the first heat exchanger is configured to thermally couple the first cooling medium, the second cooling medium and the third cooling medium to one another in a manner in which the first cooling medium, the second cooling medium and the third cooling medium are isolated from one another;

the second heat exchanger is configured to thermally couple the second cooling medium to the third cooling medium through the bypass in a manner in which the second cooling medium and the third cooling medium are isolated from each another, wherein a bypass regulating valve is arranged on the bypass, and when a temperature of the third cooling medium is lower than a preset temperature, the bypass regulating valve is opened, so that the second cooling medium within the bypass exchanges heat with the third cooling medium through the second heat exchanger;

the first heat exchanger comprises a first heat conduction channel, a second heat conduction channel and a third heat conduction channel spaced apart from one another;

the first heat conduction channel comprises a first inlet end and a first outlet end, a first water supply pipe of the first fluid pipeline is connected to the first inlet end, and a first water return pipe of the first fluid pipeline is connected to the first outlet end;

the second heat conduction channel comprises a second inlet end and a second outlet end, a second water supply pipe of the second fluid pipeline is connected to the second inlet end, and a second water return pipe of the second fluid pipeline is connected to the second outlet end;

the third heat conduction channel comprises a third inlet end and a third outlet end, the third fluid pipeline comprises a first section and a second section extending between the first heat exchanger and the second heat exchanger, the third pump set is positioned on the first section, the third inlet end is connected upstream of the first section, and the third outlet end is connected downstream of the second section;

the first heat-generating component comprises a plurality of first heat-generating components, a plurality of first fluid branches in one-to-one correspondence with the plurality of first heat-generating components are arranged on the first fluid pipeline, a first branch heat sink is arranged on each of the first fluid branches, a first branch regulating valve, a first branch temperature sensor and a first branch flow sensor are arranged downstream of each of the first fluid branches, and a first heat dissipation unit is further arranged on the first water return pipe of the first fluid pipeline;

a measured value of the first branch temperature sensor and a measured value of the first branch flow sensor are monitored, and an opening degree of the first branch regulating valve is controlled according to a target temperature value of each of the first heat-generating components to adjust a flow rate of each of the first fluid branches; and a first pressure monitoring device is arranged at at least one of an inlet and an outlet of the first pump set, and upstream and downstream of each of the first fluid branches.

14. A cooling system, comprising a first cooling loop, a second cooling loop, a third cooling loop, a first heat exchanger and a second heat exchanger, wherein the first cooling loop comprises a first fluid pipeline for cooling a first heat-generating component and a first pump set, and the first pump set is configured to cause a first cooling medium to circulate within the first fluid pipeline;

the second cooling loop comprises a second fluid pipeline for cooling a second heat-generating component and a second pump set, the second fluid pipeline comprises a main path and a bypass, and the second pump set is configured to cause a second cooling medium to circulate within the main path or within the main path and the bypass;

the third cooling loop comprises a third fluid pipeline for cooling a third heat-generating component and a third pump set, the third pump set is configured to cause a third cooling medium to circulate within the third fluid pipeline, and the third fluid pipeline communicates with both the first heat exchanger and the second heat exchanger;

the first heat exchanger is configured to thermally couple the first cooling medium, the second cooling medium and the third cooling medium to one another in a manner in which the first cooling medium, the second cooling medium and the third cooling medium are isolated from one another;

the second heat exchanger is configured to thermally couple the second cooling medium to the third cooling medium through the bypass in a manner in which the second cooling medium and the third cooling medium are isolated from each another, wherein each of the first pump set, the second pump set and the third pump set comprises one pump body or at least two pump bodies connected in parallel, a gas discharge valve is arranged at the pump body, a check valve is arranged at an outlet of the pump body, and a pump body regulating valve is arranged at an inlet of the pump body;

a pressure stabilizing device is arranged at each of inlets of the first pump set, the second pump set and the third pump set.

15. A wind-driven generator system comprising:

a first heat-generating component comprising at least one of a shafting, a cable, a nacelle, a pitch system, a nacelle cabinet and a nacelle base;

a second heat-generating component comprising a generator;

a third heat-generating component comprises at least one of a transformer, a converter and an auxiliary transformer; and the cooling system according to claim 1.

16. A wind-driven generator system comprising:

a first heat-generating component comprising at least one of a shafting, a cable, a nacelle, a pitch system, a nacelle cabinet and a nacelle base;

a second heat-generating component comprising a generator;

a third heat-generating component comprises at least one of a transformer, a converter and an auxiliary transformer; and the cooling system according to claim 13.

17. A wind-driven generator system comprising:

a first heat-generating component comprising at least one of a shafting, a cable, a nacelle, a pitch system, a nacelle cabinet and a nacelle base;

a second heat-generating component comprising a generator;

a third heat-generating component comprises at least one of a transformer, a converter and an auxiliary transformer; and the cooling system according to claim 14.

* * * * *